United States Patent Office 3,537,839
Patented Nov. 3, 1970

3,537,839
METHOD FOR CONTROLLING UNWANTED PLANT GROWTH WITH 1,2,4-OXADIAZINES
Gustav Steinbrunn, Schwegenheim, Pfalz, Adolf Fischer, Mutterstadt, Pfalz, and Albrecht Zschocke, Bad Duerkheim, Germany, assignors to Badische Anilin- & Soda-Fabrik Aktiengesellschaft Ludwigshafen (Rhine), Germany
No Drawing. Filed June 23, 1967, Ser. No. 648,239
Claims priority, application Germany, July 2, 1966, 1,670,100
Int. Cl. A01n 9/22
U.S. Cl. 71—92           6 Claims

ABSTRACT OF THE DISCLOSURE 1,2,4-oxadiazines and a method of controlling undesirable plants with said compounds.

---

The present invention relates to 1,2,4-oxadiazines, in particular 1,2,4-oxadiazines which are substituted by a phenyl radical in 4-position, and to a method of controlling undesirable vegetation with said compounds.

It is known that 4,6-dinitro-3-sec-butylphenyl acetate and 2-chloro-4,6-bis-(ethylamino)-s-triazine may be used as the active ingredients of herbicides. However their action is not satisfactory.

An object of this invention is to provide new valuable 1,2,4-oxadiazines, in particular 1,2,4-oxadiazines substituted by a phenyl radical in 4-position. Another object of the invention is to provide a method of controlling unwanted plant growth with 1,2,4-oxadiazines without damaging crop plants. A further object of the invention is to provide a method of controlling unwanted plant growth with 1,2,4-oxadiazines whereby all the plants are controlled over a specific area.

These and other objects of the invention are achieved with oxadiazines having the formula

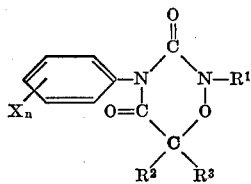

in which X denotes halogen or a nitro, trifluoromethyl, lower alkyl, methoxy or methylsulfonyl group, $n$ is one of the integers 0 to 3, $R^1$ denotes hydrogen or a lower aliphatic radical, an aralkyl or cycloalkyl radical, $R^2$ denotes hydrogen or a lower alkyl radical and $R^3$ denotes hydrogen or a lower alkyl radical or a phenyl radical which may be substituted by halogen or methyl.

The oxadiazines to be used according to the invention may be simply prepared by eliminating water from appropriate N-phenyl-N'-carboxyalkoxyureas; the urea derivatives may be obtained by reacting alkali metal salts or alkaline earth metal salts of N'-hydroxyurea derivatives with α-halocarboxylic acids.

N-phenyl-N'-carboxyalkoxyureas are cyclized to the oxadiazines preferably using thionyl chloride, phosgene or derivatives of phosphorus.

For example by reacting N-3,4-dichlorophenyl-N'-methyl-N'-hydroxyurea with chloroacetic acid in water or aqueous ethyl alcohol, the N - 3,4 - dichlorophenyl - N' - methyl-N'-carboxymethoxyurea is obtained which, when treated with thionyl chloride, gives 3,5-dioxo-2-methyl-4-(3',4'-dichlorophenyl)-1,2,4-oxadiazine.

The oxadiazines to be used according to this invention may also be prepared by eliminating alcohol from appropriate N-phenyl-N'-alkoxycarbonylalkoxy ureas; the urea derivatives may be obtained by reacting alkali metal salts or alkaline earth metal salts of N-hydroxyurea derivatives with α-halocarboxylic acid esters.

The following description of an experiment will illustrate how the compounds to be used according to the invention are prepared.

47 parts by weight of N-3,4-dichlorophenyl-N'-methyl-N'-hydroxyurea is suspended in 200 parts by weight of water and mixed at room temperature while stirring well with 12 parts by weight of potassium hydroxide dissolved in 20 parts by weight of water. A solution of 20 parts by weight of chloroacetic acid in 50 parts by weihgt of water which has previously been neutralized at 10° to 15° C. with the theoretical amount of sodium carbonate solution is dripped into the solution obtained above at room temperature. The reaction mixture is then stirred for several hours at a temperature of 40° to 50° C. and allowed to stand overnight at room temperature. While cooling, the solution is acidified with dilute hydrochloric acid (1:1) and the resulting precipitate is suction filtered, washed with water and dried. After recrystallization from aqueous ethanol 46 parts by weight of N-3,4-dichlorphenyl-N'-methyl-N'-carboxymethoxyurea is obtained with a melting point of 185° to 186° C.

12 parts by weight of thionyl chloride is dripped while stirring at 60° to 70° C. into 15 parts by weight of N-3,4-dichlorophenyl - N' - methyl - N' - carboxymethoxyurea dissolved in 60 ml. of tetrahydrofuran and the mixture is stirred for two hours at 70° C. After being allowed to cool the solution is evaporated to dryness in vacuo, and the residue is brought to the boil in toluene with an addition of animal charcoal, filtered hot and evaporated to dryness in vacuo. 12 parts by weight of 3,5-dioxo-2-methyl-4-(3',4'-dichlorophenyl)-1,2,4-oxadiazine with a melting point of 109° C. is obtained.

The other compounds to be used according to the invention may be prepared by analogous methods.

The following substituted N-hydroxyureas are examples of suitable starting materials for the preparation of substituted 3,5-dioxo-4-phenyl-1,2,4-oxadiazines (the N-hydroxyureas may in their turn be prepared for example from the appropriate isocyanates and substituted hydroxylamines):

N-3,4-dichlorophenyl-N'-methyl-N'-hydroxyurea
N-3,4-dichlorophenyl-N'-isopropyl-N'-hydroxyurea
N-3,4-dichlorophenyl-N'-cyclohexyl-N'-hydroxyurea
N-3-trifluoromethylphenyl-N'-methyl-N'-hydroxyurea
N-3-chlorophenyl-N'-benzyl-N'-hydroxyurea
N-phenyl-N'-2-methylcyclohexyl-N'-hydroxyurea
N-3-nitrophenyl-N'-methyl-N'-hydroxyurea
N-4-fluorophenyl-N'-methyl-N'-hydroxyurea
N-4-methoxyphenyl-N'-isopropyl-N'-hydroxyurea
N-4-methylsulfonylphenyl-N'-methyl-N'-hydroxyurea The following are examples of suitable α-halocarboxylic acids (or their esters) for the preparation of oxadiazines: α-chloroacetic acid, α-bromoacetic acid, α-chloropropionic acid, α-bromopropionic acid, α-chlorobutyric acid, α-bromobutyric acid, α-chloroisobutyric acid, α-bromoisobutylric acid, α-chlorophenylacetic acid and α-bromophenylacetic acid.

The reaction of the α-halocarboxylic acids (esters) with the alkali metal salts or alkaline earth metal salts of hydroxyureas may be carried out between 0° and 130° C., preferably between 25° and 80° C. Equivalent amounts of alkali and halocarboxylic acid (ester) may be used, but it is more advantageous to use a slight excess of the two with reference to hydroxyurea.

If, as a result of reacting N-hydroxyurea with a α-halocarboxylic acid (ester), a 3,5-dioxo-4-phenyl-1,2,4- oxadiazine is obtained which is unsubstituted in 2-position, a desirable radical R¹ may be introduced via a metal salt of this compound and reaction with an alkylhalide or alkylsulfate to form the oxadiazine molecule.

The following are examples of compounds which are suitable as agents according to the invention for controlling plant growth:

3,5-dioxo-2-methyl - (3',4'-dichlorophenyl)-1,2,4-oxadiazine; M.P. 109° C.

3,5-dioxo-2-methyl-(3',4' - dichlorophenyl)-6-methyl-1,2,4-oxadiazine; M.P. 107° to 108° C.

3,5-dioxo-2 - methyl - 4-(3',4'-dichlorophenyl)-6-phenyl-1,2,4-oxadiazine; M.P. 155° to 156° C.

The following compounds are also suitable:

| X | R¹ | R² | R³ | M.P.,°C. |
|---|---|---|---|---|
| 3-CF₃ | —CH₃ | H | H | 55 |
| 3-NO₂ | —CH₃ | H | H | 168-170 |
| 4-Cl | —CH₃ | H | H | 146-147 |
| 3-Cl | —CH₃ | H | H | 105-107 |
| 4-Cl | —CH(CH₃)₂ | H | H | 112 |
|  | —CH₃ | H | H | 140-142 |
| 3-Cl, 4-Cl | —CH(CH₃)₂ | H | H | 152-153 |
| 3-Cl | —CH(CH₃)₂ | H | H | 89 |
| 2-OCH₃, 4-OCH₃ | —CH₃ | H | H | 91-91 |
| 3-CH₃ | —CH₃ | H | H | 115-117 |
| 3-Cl, 4-CH₃ | —CH₃ | H | H | 104 |
| 4-Br | —CH₃ | H | H | 144 |
| 3-OCH₃ | —CH₃ | H | H | 90-92 |
| 4-Cl | —CH₃ | —CH₃ | H | 135-136 |
| 3-Cl | —CH₃ | —CH₃ | H | 122 |
| 3-Br, 4-F | —CH₃ | H | H | (¹) |
| 3-Cl, 4-Br | —CH₃ | H | H | 127-128 |
| 3-Br, 4-Br | —CH₃ | H | H | 103-105 |
| 3-CF₃, 4-Br | —CH₃ | H | H | 128 |
| (phenyl)H | —CH₃ | H |  | 112-113 |
| 3-Cl, 4-Cl | —CH₃ | C₂H₅ | H | 70-71 |
| 3-Cl, 4-Cl | —CH₃ | —CH₃ | —CH₃ | 100-101 |
|  | —CH(CH)CH₃ | H | H | 125 |
| 4-Br | —CH₃ | —CH₃ | H | 120-122 |
|  | —CH₃ | —CH₃ | H | 142-143 |
| 3-Cl, 4-Br | —CH₃ | —CH₃ | H | 125 |
| 4-F | —CH₃ | H | H | 111 |
| 3-CH₃, 4-CH₃ | —CH₃ | H | H | 154-155 |
| 4-Cl | —CH₃ | —C₂H₅ | H | 77-78 |
| 3-CF₃, 4-Cl | —CH₃ | H | H | 102-104 |

¹ Syrup.

The agents for regulating plant growth according to this invention may be used as solutions, emulsions, suspensions or dusts. The form of application depend entirely on the purpose for which the agents are being used; in any case it should ensure a fine distribution of the active ingredient.

The active ingredients may be mixed with fertilizers and applied in granular form. The herbicides may also be applied together with other herbicides, e.g. triazines, dichloroalkylcarboxylic acid derivatives, ureas, uracils and pyridazones.

For the preparation of solutions to be sprayed direct, mineral oil fractions with medium to high boiling points such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent.

Dusts may be prepared by mixing or grinding the active ingredients with a solid carrier.

The application of the herbicides according to the invention is illustrated by the following examples.

EXAMPLE 1

In a greenhouse the plants Indian corn (*Zea mays*), barley (*Hordeum vulgare*), wheat (*Triticum vulgare*), wild mustard (*Sinapis arvensis*), white goosefoot (*Chenopodium album*), small nettle (*Urtica urens*), chickweed (*Stellaria media*), bur marigold (*Bidens pilosa*), summer cypress (*Kochia scoparia*), wild oats (*Avena fatua*), annual meadow grass (*Poa annua*) and slender foxtail (*Alopecurus myosuroides*) were treated at a growth height of 4–17 cm. with 3,5-dioxo-2-methyl-4-(3',4'-dichlorophenyl)-1,2,4-oxadiazine (I) and, for comparison, with 4,6-dinitro-2-sec-butylphenyl acetate (II), each at a rate of 2 kg. of active ingredient per hectare, dispersed in 500 liters of water. After three to four weeks it was observed that compound I had a stronger herbicidal action than compound II.

The results of the experiment can be seen from the table below.

| | Active ingredient | |
|---|---|---|
| | I | II |
| Crop plants: | | |
| Indian corn | 0 | 20-30 |
| Barley | 0 | 10 |
| Wheat | 0 | 0 |
| Unwanted plants: | | |
| Wild mustard | 100 | 90 |
| Goosefoot | 100 | 90 |
| Nettle | 100 | 90-100 |
| Chickweed | 90-100 | 80-90 |
| Bur marigold | 100 | 80 |
| Summer cypress | 90-100 | 80 |
| Wild oats | 60-70 | 10 |
| Annual meadow grass | 80-90 | 0 |
| Slender Foxtail | 90-100 | 0 |

NOTE.—0=no damage, 100=complete destruction.

The following compounds have the same biological action as I in Examples 1 to 4:

3,5-dioxo-2-benzyl-4-(3'-chloro-4'-bromophenyl)-1,2,4-oxadiazine 3,5-dioxo-2-methyl-4-(4'-methylsulfonylphenyl)-1,2,4-oxadiazine 3,5-dioxo-2-isopropyl-4-(3'-chlorophenyl)-1,2,4-oxadiazine 3,5-dioxo-2-isopropyl-4-(3'-trifluoromethylphenyl)-1,2,4-oxadiazine 3,5-dioxo-2-methyl-4-(4'-chlorophenyl)-6-isopropyl-1,2,4-oxadiazine 3,5-dioxo-2-tert.butyl-4-(3'-methylphenyl)-1,2,4-oxadiazine 3,5-dioxo-2-methyl-4-(4'-methoxyphenyl)-1,2,4-oxadiazine 3,5-dioxo-2-methyl-4-(3'-nitrophenyl)-1,2,4-oxadiazine 3,5-dioxo-2-methyl-4-(4'-fluorophenyl)-1,2,4-oxadiazine 3,5-dioxo-2-cyclohexyl-4-(3',4'-dichlorophenyl)-1,2,4-oxadiazine 3,5-dioxo-2-methyl-4-(3',4'-dichlorophenyl)-6-methyl-1,2,4-oxadiazine 3,5-dioxo-2-methyl-4-(3'-trifluoromethylphenyl)-6-ethyl-1,2,4-oxadiazine 3,5-dioxo-2-methyl-4-(3',4'-dichlorophenyl)-6-phenyl-1,2,4-oxadiazine 3,5-dioxo-2-isopropyl-4-(3',4'-dichlorophenyl)-6,6-dimethyl-1,2,4-oxadiazine

EXAMPLE 2

An agricultural plot which was infested with wild mustard (*Sinapis arvensis*), white goosefoot (*Chenopodium album*), small nettle (*Urtica urens*), chickweed (*Stellaria media*), bur marigold (*Bidens pilosa*), summer cypress (*Kochia scoparia*), wild oats (*Avena fatua*), annual meadow grass (*Poa annua*) and slender foxtail (*Alopecurus myosuroides*) was treated with 3,5-dioxo-2-methyl-4-(3',4'-dichlorophenyl) - 1,2,4-oxadiazine (I) and, for comparison, with 2-chloro-4,6-bis(ethylamino)-s-triazine (II). The plants had a growth height of 3 to 8 cm. when sprayed. The rate of application in each case was 5 kg. of active ingredient per hectare, dispersed in 500 liters of water. It was observed after a few days that the broadleaved and grass weeds treated with I exhibited greater damage than those treated with II. After three weeks almost all the plants were completely withered.

EXAMPLE 3

Seeds of Indian corn (*Zea mays*), barley (*Hordeum vulgare*), wheat (*Triticum vulgare*), cotton (*Gossypium sp.*), wild mustard (*Sinapis arvensis*), gallant soldier (*Galinsoga parviflora*), small nettle (*Urtica urens*), chickweed (*Stellaria media*), chamomile (*Matricaria chamomilla*) and annual meadow grass (*Poa annua*) were sown in plastic pots 8 cm. in diameter and the soil was sprayed with 3,5 - dioxo - 2 - methyl-4-(3',4'-dichlorophenyl)-1,2,4-oxadiazine at a rate of 6 kg. of active ingredient per hectare, dispersed in 500 liters of water. After four weeks it was observed that the plants wild mustard (*Sinapis arvensis*), gallant soldier (*Galinsoga parviflora*), small nettle (*Urtica urens*), chickweed (*Stellaria media*), chamomile (*Matricaria chamomilla*) and annual meadow grass (*Poa annua*) had completely withered, whereas the Indian corn (*Zea mays*), barley (*Hordeum vulgare*), wheat (*Triticum vulgare*) and cotton (*Gossypium sp.*) were uninjured and growing normally.

EXAMPLE 4

An experimental plot which had been sown with wild mustard (*Sinapis arvensis*), white goosefoot (*Chenopodium album*), small nettle (*Urtica urens*), chickweed (*Stellaria media*), chamomile (*Matricaria chamomilla*), gallant soldier (*Galinsoga parviflora*) and annual meadow grass (*Poa annua*) were treated on the day of sowing with 3,5-dioxo - 2 - methyl-4-(3',4'-dichlorophenyl)-1,2,4-oxadiazine. The rate of application was 10 kg. of active ingredient per hectare, dispersed in 500 liters of water per hectare. After four to five weeks all the plants had completely withered.

We claim:
1. A method of controlling unwanted plant growth which comprises treating the area of said plant growth with a phytotoxic amount of a 1,2,4-oxadiazine of the formula

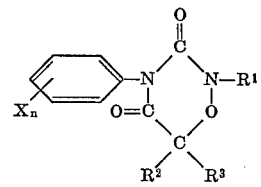

in which X denotes halogen or a nitro, trifluoromethyl, lower alkyl, methoxy or methylsulfonyl group, $n$ is one of the integers 0 to 3, $R^1$ denotes hydrogen or a lower aliphatic radical, an aralkyl radical or a cycloalkyl radical, $R^2$ denotes hydrogen or lower alkyl, and $R^3$ denotes hydrogen, lower alkyl, phenyl or phenyl substituted by halogen or methyl.

2. A method as claimed in claim 1 wherein the soil used for said plant growth is treated with said 1,2,4-oxadiazine.

3. A method as claimed in claim 1 wherein said unwanted plants are treated with said 1,2,4-oxadiazine.

4. A method as claimed in claim 1 wherein the 1,2,4-oxadiazine is 3,5 - dioxo - 2 - methyl-4-(3',4'-dichlorophenyl)-1,2,4-oxadiazine.

5. A method as claimed in claim 1 wherein the 1,2,4-oxadiazine is 3,5 - dioxo - 2 - methyl-4-(3',4'-dichlorophenyl)-6-methyl-1,2,4-oxadiazine.

6. A method as claimed in claim 1 wherein the 1,2,4-oxadiazine is 3,5 - dioxo - 2 - methyl-4-(3',4'-dichlorophenyl)-6-phenyl-1,2,4-oxadiazine.

References Cited
UNITED STATES PATENTS
3,282,987  11/1966  Ellis _____ 71—106

FOREIGN PATENTS
1,432,738  2/1966  France.

JAMES O. THOMAS, Jr., Primary Examiner

U.S. Cl. X.R.

260—244, 453, 500.5

PO-1050
(5/69)

UNITED STATES PATENT OFFICE
CERTIFICATE OF CORRECTION

Patent No. 3,537,839      Dated November 3, 1970

Inventor(s) Gustav Steinbrunn et al

It is certified that error appears in the above-identified patent and that said Letters Patent are hereby corrected as shown below:

Column 2, line 5, "allustrate" should read -- illustrate --; line 13, "weihgt" should read -- weight --.

Column 3, line 48, "CH" should read -- $CH_3$ --; line 61, "depend" should read -- depends --.

SIGNED AND SEALED
FEB 2 1971

(SEAL)
Attest:

Edward M. Fletcher, Jr.
Attesting Officer

WILLIAM E. SCHUYLER, JR.
Commissioner of Patents